(12) United States Patent
Kono et al.

(10) Patent No.: US 6,476,600 B2
(45) Date of Patent: Nov. 5, 2002

(54) ANGULAR POSITION MEASURING DEVICE

(75) Inventors: Yoshiyuki Kono, Obu (JP); Takashi Hamaoka, Kariya (JP); Takamitsu Kubota, Kariya (JP); Takuya Fukitsuke, Tokai (JP); Tetsuya Aoki, Toyoake (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/769,517

(22) Filed: Jan. 26, 2001

(65) Prior Publication Data

US 2001/0009366 A1 Jul. 26, 2001

(30) Foreign Application Priority Data

Jan. 26, 2000 (JP) ........................................ 2000-021822
Feb. 29, 2000 (JP) ........................................ 2000-053927
Apr. 19, 2000 (JP) ........................................ 2000-117703

(51) Int. Cl.[7] ............................. G01B 7/14; G01R 33/06
(52) U.S. Cl. ............................. 324/207.2; 324/207.25
(58) Field of Search ........................ 324/207.2, 207.25, 324/207.21, 207.22, 251, 252, 207.12, 173, 174; 338/32 R, 32 M

(56) References Cited

U.S. PATENT DOCUMENTS

| 5,528,139 A | 6/1996 | Oudet et al. |
| 5,789,917 A | * 8/1998 | Oudet et al. ............. 324/207.2 |
| 5,861,745 A | 1/1999 | Herden |
| 6,043,645 A | * 3/2000 | Oudet et al. ............. 324/207.2 |
| 6,130,535 A | 10/2000 | Herden et al. |

FOREIGN PATENT DOCUMENTS

| DE | 19634281 | 2/1998 |
| DE | 19726691 | 1/1999 |
| EP | 1065473 | 1/2001 |
| JP | 2842482 | 10/1998 |
| JP | 11-83422 | 3/1999 |
| JP | 2920179 | 4/1999 |
| WO | WO 98/08060 | 2/1998 |

* cited by examiner

Primary Examiner—Edward Lefkowitz
Assistant Examiner—Subhash Zaveri
(74) Attorney, Agent, or Firm—Harness, Dickey & Pierce, PLC

(57) ABSTRACT

A compact and high-accuracy angular position measuring device is provided which has magnets installed in a rotor core and a magnetic sensor installed in a stator core. The magnetic sensor produces an output indicative of an angular position of the rotor core as a function of a change in density of magnetic flux produced by the magnets. The magnets are so arranged in the rotor core that the same poles are opposed magnetically to produce a repellent force in magnetic fields of the magnets, thereby causing the magnetic flux to go to the magnetic sensor through the rotor core. This eliminates the need for an air gap between the stator core and the poles of the magnets which is formed in a conventional device, thus allowing the device to be reduced in size and an error in output of the device to be decreased.

20 Claims, 10 Drawing Sheets

ANGULAR POSITION MEASURING DEVICE

BACKGROUND OF THE INVENTION

1. Technical Field of the Invention

The present invention relates generally to an improved structure of a device for measuring an angular position of an object using a magnetic detector and magnets, and more particularly to a compact and high-accuracy angular position measuring device.

2. Background Art

U.S. Pat. No. 5,861,745 (Japanese Patent First Publication No. 2920179, PCT:WO98/080601) discloses an angular position measuring device using a magnetic detector such as a Hall element and magnets.

FIG. 19 shows one example of conventional angular position measuring devices designed to measure an opened position of a throttle valve of an internal combustion engine. The device includes a cylindrical rotor core (i.e., a yoke) 11 rotating along with the throttle valve (not shown) and a stator core 12 disposed coaxially within the rotor core 11. Disposed between the rotor core 11 and the stator core 12 are two arc-shaped magnets 13 which are diametrically opposed to each other. Each of the magnets 13 is so magnetized that all lines of magnetic force are oriented in a radius direction of the magnet 13. A magnetic gap 14 is formed in the stator core 12 which has a constant width and extends through the center of the stator core 12 in a diameter direction. A magnetic detector such as a Hall IC is disposed at the center of the magnetic gap 14.

The density of a magnetic flux through the magnetic gap 14 in the stator core 12 changes as a function of an angular position of the rotor core 11. The magnetic detector 15 produces an output as a function of the magnetic flux density. Specifically, the angular position of the rotor core 11, or the opened position of the throttle valve is determined using the output of the magnetic detector 15.

The arc-shaped magnets 13 are, as described above, magnetized radially. Uniformly magnetizing the magnets 13 requires decreasing the magnetic flux density in an outer peripheral portion of the magnets 13, while increasing the magnetic flux density in an inner peripheral portion of the magnets 13. Such magnets are, however, difficult to produce and may have a great variation in quality. The variation in quality will lead to an error in an output of the magnetic detector 15.

Additionally, the installation of the magnets 13 between the rotor core 11 and the stator core 12 will result in an increase in diameter of the rotor core 11, thereby leading to an increase in overall size of the angular position measuring device.

SUMMARY OF THE INVENTION

It is therefore a principal object of the invention to avoid the disadvantages of the prior art.

It is another object of the invention to provide a compact angular position measuring device capable of determining an angular position of a rotary object with high accuracy.

According to one aspect of the invention, there is provided an angular position measuring device which comprises: (a) a stationary member; (b) a rotatable member rotatable following rotation of an object to be measured in angular position; (c) a plurality of magnets installed in one of the stationary member and the rotatable member so that the same poles are opposed magnetically to produce a repellent force in magnetic fields of the magnets; and (d) a sensor element installed in the other of the stationary member and the rotatable member, the sensor element being responsive to a change in density of magnetic flux produced by the magnets to provide an output as a function of an angular position of the object.

In the preferred mode of the invention, each of the magnets is made of one of a plate and a cylindrical member whose ends are magnetized.

The rotatable member is made of a hollow cylindrical yoke having installed therein the magnets. The stationary member is made of a stator core having installed therein the sensor element and disposed inside the cylindrical yoke. A sensor gap is formed in the stator core within which the sensor element is disposed.

The cylindrical yoke may have air cavities formed in an inner surface thereof which open to the magnets for avoiding a short of the magnetic flux between each pole of the magnets and the stator core.

The magnets may be so arranged as to define two magnetic paths along which the magnetic fluxes produced by the magnets pass. The magnetic paths extend symmetrically through the stationary member and the rotatable member.

The stator core is made of three or more parts which are so fabricated as to define air gaps one of which is the sensor gap within which the sensor element is disposed.

The air gaps extend radially in the stator core at a regular angular interval. The magnets are arranged at an angular interval identical with the angular interval of the air gaps.

The stator core may be circular in cross section. The one of the air gaps employed as the sensor gap is longer than a radius of the stator core.

The one of the air gaps as employed as the sensor gap is longer than the other air gaps.

The stator core may have formed in at least one of ends of the sensor gap a greater air cavity which serves to concentrate the magnetic flux at the sensor gap.

An air gap may be defined between the inside of the cylindrical yoke and the outside of the stator core. The air gap is defined by an interval between the inside of the cylindrical yoke and the outside of the stator core which varies in a circumferential direction of the inside of the cylindrical yoke.

The interval may be maximized at each of the poles of said magnets.

The cylindrical yoke defines therein an oval chamber in which the stator core is disposed.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
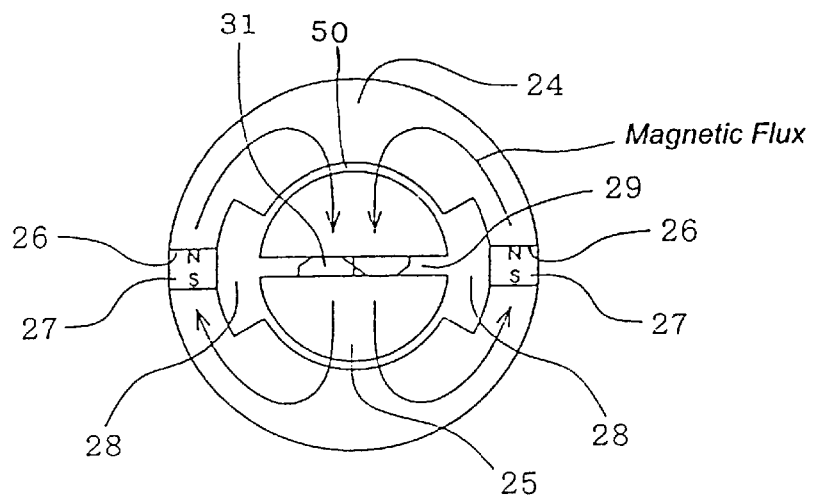
FIG. 1 is a sectional view which shows an angular position measuring device according to the first embodiment of the invention.
Figure 2:
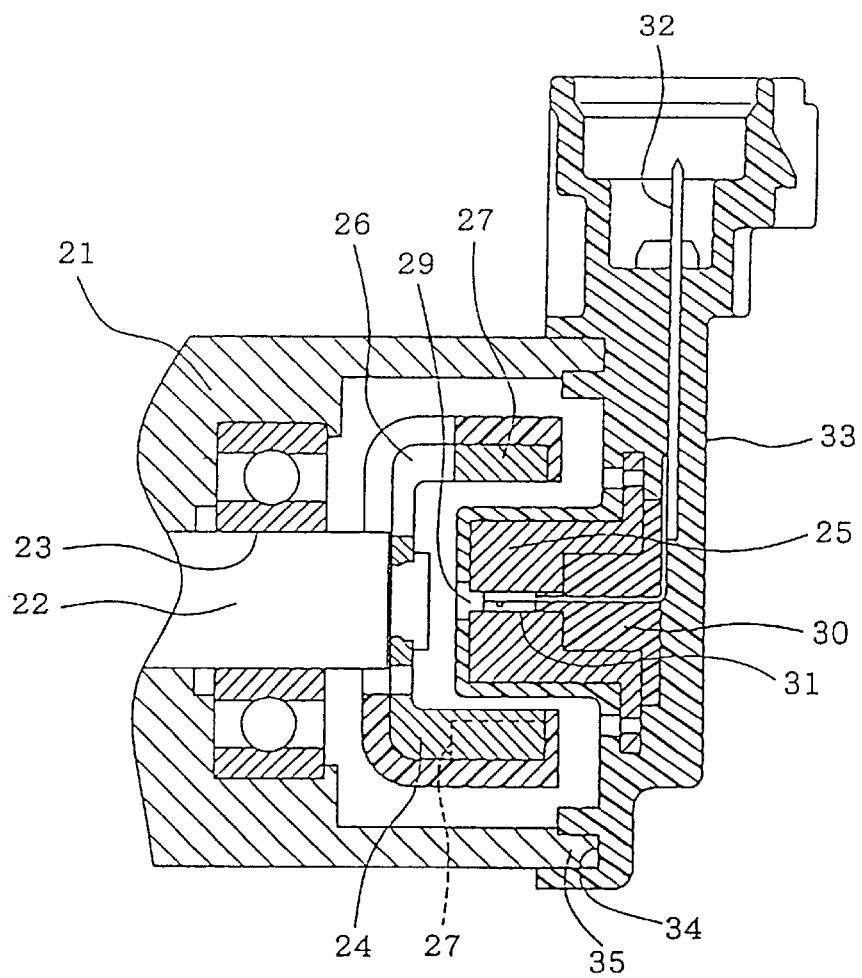
FIG. 2 is a vertical sectional view which shows the angular position measuring device of FIG. 1.

Referring to the drawings, wherein like reference numbers refer to like parts in several views, particularly to FIGS. 1 and 2, there is shown an angular position measuring device according to the invention.

The angular position measuring device generally includes a device housing 21, a cup-shaped rotor core (i.e., a yoke) 24, and a cylindrical stator core 25. The device housing 21 has disposed therein a bearing 23 coupled to a rotary shaft 22 of, for example, a throttle valve of an internal combustion engine (not shown) to be measured in a rotational angle or angular position. The rotor core 24 is attached to an end of the rotary shaft 22 by staking. The stator core 25 is disposed in the rotor core 24 coaxially therewith. The rotor core 24 and the stator core 25 are each made of a magnetic material such as iron.

The rotor core 24, as clearly shown in FIG. 1, has formed therein diametrically opposed recesses 26 within which magnets 27 are fitted using adhesive, respectively. Each of the magnets 27 is made of a cylindrical or plate member which has two opposed ends magnetized to have North and South poles. The magnets 27 are so arranged that the same poles thereof are opposed in a circumferential direction to produce the repellent force in magnetic fields of the magnets 27. Semi-circular small air gaps 50 which are diametrically opposed to each other are formed between an inner surface of the rotor core 24 and an outer surface of the stator core 25 except vicinities of the magnets 27 so that the magnetic flux emerging from the North pole of each of the magnets 27 may pass through the stator core 25 from the rotor core 24 and return back to the South pole of the magnets 27 through the rotor core 24. The rotor core 24 has air cavities 28 formed in the vicinity of the magnets 27 for avoiding a short of the magnetic flux between each pole of the magnets 27 and the stator core 25, thereby avoiding a reduction in density of the magnetic flux through the stator core 25 to ensure the measurement accuracy of the angular position measuring device.

A constant sensor gap 29 is formed in the stator core 25 which passes through the center thereof in a diameter direction. The sensor gap 29 serves to form therein a parallel magnetic field. The stator core 25 is, as can be seen from FIG. 2, made up of two semi-cylindrical members which are held at a given interval away from each other by a resinous spacer 30, thereby defining the sensor gap 29. Two Hall ICs 31 are arrayed adjacent to each other within the sensor gap 29. Each of the Hall ICs 31 has installed therein a magnetic sensor and an amplifier and works to produce a voltage signal as a function of the density of a magnetic flux passing therethrough. Each of the Hall ICs 31 may have functions of output gain adjustment, offset adjustment, electrically trimming a temperature characteristic-correcting program using an external device, and self-diagnosing a breakage and short of an electric circuit.

The Hall ICs 31 are positioned by the spacer 30 and have terminals which pass through the spacer 30 and are welded to connector pins 32. The connector pin 32, the stator core 24, and the spacer 30 are installed in a connector housing 33 which is molded from a resinous material. The connector housing 33 has formed in a left surface, as viewed in FIG. 2, an annular groove 34 into which the end of the device housing 21 is press-fitted and bonded, thereby holding a coaxial relation between the rotor core 24 and the stator core 25.

Figure 3:
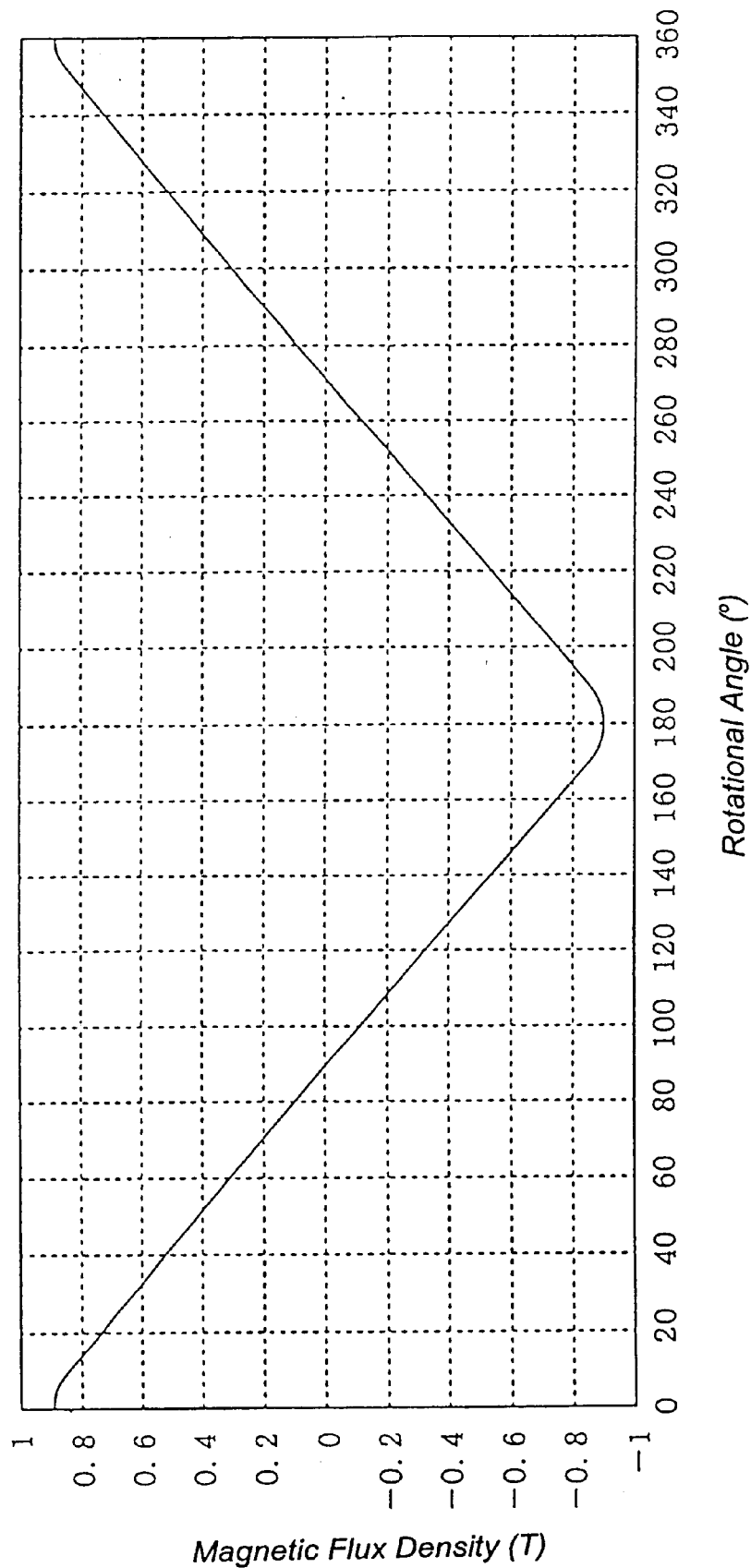
FIG. 3 is a graph which shows a relation between a rotational angle of a rotor core and the density of magnetic flux passing through a Hall IC.

The two magnets 27 are, as described above, so arranged in diametrically opposed portions of the rotor core 24 as to produce the repellent force in the magnetic fields thereof. The magnetic flux emerging from the North pole of each of the magnets 27, thus, goes to the stator core 25 through the rotor core 24 to the sensor gap 29 (i.e., the Hall ICs 31) and back to the rotor core 24 through the stator core 25 and enters the South pole of the magnet 27. When the rotor core 24 starts to rotate following rotation of the rotary shaft 22, it will cause the density of magnetic flux through the sensor gap 29 of the stator core 25 to change, as shown in FIG. 3, as a function of a rotational angle of the rotor core 24, so that each of the Hall ICs 31 produce a voltage output proportional to the rotational angle of the rotor core 24. The determination of the rotational angle or angular position of the rotor core 24 is made using two voltage outputs from the Hall ICs 31. For example, if a difference between the two voltage outputs exceeds a given value, it may be concluded that some failure has occurred in the angular position measuring device.

Figure 19:
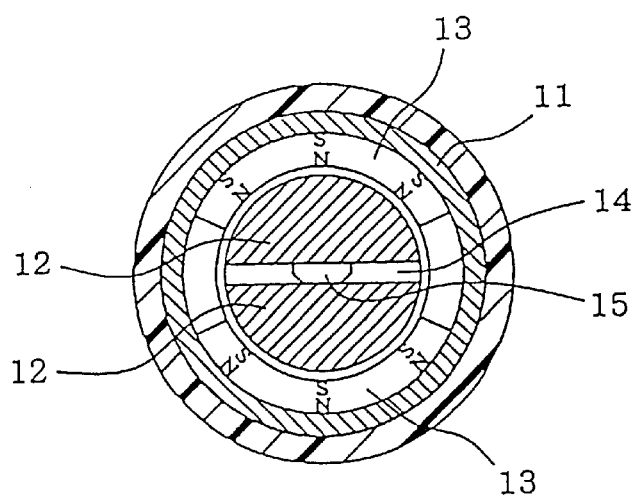
FIG. 19 is a sectional view which shows a conventional angular position measuring device.

The installation of the two magnets 27 in the diametrically opposed portions of the rotor core 24 in such a manner that the same poles are opposed to each other in a circumferential direction of the rotor core 24 eliminates the need for an air gap, like the one shown in FIG. 19, between the pole surfaces of the magnets 27 and the periphery of the stator core 25, thereby increasing the degree of freedom of design of the magnets 27 which allows each of the magnets 27 to be formed by a plate or cylindrical member that is easy to manufacture and magnetize. This also results in a decrease in error of outputs of the Hall ICs 31, thus increasing the accuracy in determining the angular position of the rotary shaft 22. Further, the arrangement of the magnets 27 in this embodiment eliminates the need for installation of the magnets 27 on an inner peripheral surface of the rotor core 24, thereby allowing the rotor core 24 to be reduced in size in the radius direction thereof.

Figure 4:
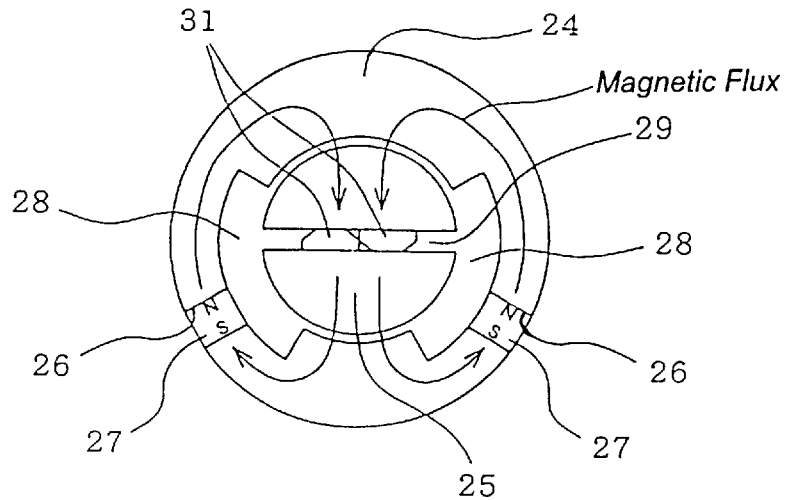
FIG. 4 is a sectional view which shows an angular position measuring device according to the second embodiment of the invention.

FIG. 4 shows an angular position measuring device according to the second embodiment of the invention.

The magnets 27 are so installed in the rotor core 24 that a circumferential distance between the North poles of the magnets 27 is greater than that between the South poles. Of course, the circumferential distance between the South poles of the magnets 27 may be greater than that between the North poles. The air cavities 28 serving to avoid a short of the magnetic flux between each pole of the magnets 27 and the stator core 25 extend longer than in the first embodiment. Other arrangements are identical with those in the first embodiment, and explanation thereof in detail will be omitted here.

If the paths of the magnetic flux produced by the two magnets 27 are symmetrical, as shown in FIG. 4, the magnetic flux density, as shown in FIG. 3, increases and decreases symmetrically as a function of a rotational angle of the rotor core 24, however, the invention is not always limited to such a geometrical relation.

The above embodiments form each path of the magnetic flux using one of the magnets 27, however, may employ a plurality of magnets which are so arrayed that the North pole of one of the magnets is in contact with the South pole of an adjacent one for strengthening the magnetic field. Alternatively, three or more magnets may be so installed in the rotor core 24 at given intervals that adjacent two of the magnets produce a repellent force. In this case, the Hall ICs 31 are disposed in an area through which the magnetic fluxes produced by adjacent two of the magnets pass in parallel.

The shape of the magnets 27 is not limited to a cylindrical or flat one and may be determined in view of an installation place or ease of manufacture. The magnets 27 may be different in size from each other.

Figure 5:
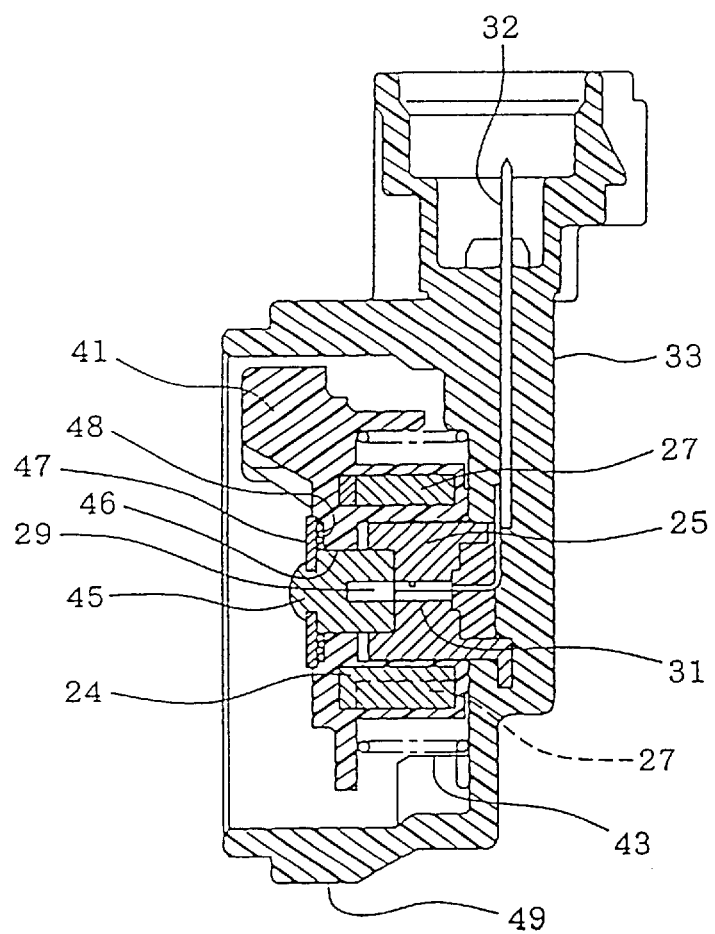
FIG. 5 is a vertical sectional view which shows an angular position measuring according to the third embodiment of the invention.

FIG. 5 shows an angular position measuring device according to the third embodiment of the invention. The same reference numbers as employed in the first embodiment refer to the same parts, and explanation thereof in detail will be omitted here.

A rotary lever 41 is molded from a resinous material and has formed integrally therein the rotor core 24 within which two magnets 27 are installed. The rotary lever 41 is coupled to an object to be measured in angular position and has a cavity within which the stator core 25 is fitted in contact with an inner wall (i.e., a bearing surface) of the cavity so that the rotary lever 41 may rotate in synchronization with the object. A coil spring 43 is connected at one end to an inner wall of a cylindrical cover 49 and at the other end to the rotary lever 41 so that upon release of torque transmitted from the object, the rotary lever 41 is returned back to an angular null position.

A shaft 45 made of a non-magnetic material is fitted in a recess formed in the center of an end surface of the stator core 25. The shaft passes through a hole 46 formed in the rotary lever 41. A stopper plate 47 is fitted in a groove formed in the head of the shaft 45 to prevent the rotary lever 45 from being dislodged from the shaft 45 (i.e., the stator core 25). A spring washer 48 is disposed between the stopper plate 47 and the rotary lever 41 to minimize the thrust of the rotary lever 41.

The connector housing 33 is formed integrally with the cover 49. The cover 49 has disposed therein the rotary lever 41 and the rotor core 24. The magnets 27 are, like the first embodiment, so arranged in diametrically opposed portions of the rotor core 24 as that the magnetic flux emerging from the North pole of each of the magnets 27 goes to the stator core 25 through the rotor core 24 to the sensor gap 29 (i.e., the Hall ICs 31) and back to the rotor core 24 through the stator core 25 and enters the South pole of the magnet 27. Other arrangements are identical with those in the first embodiment.

Figure 6:
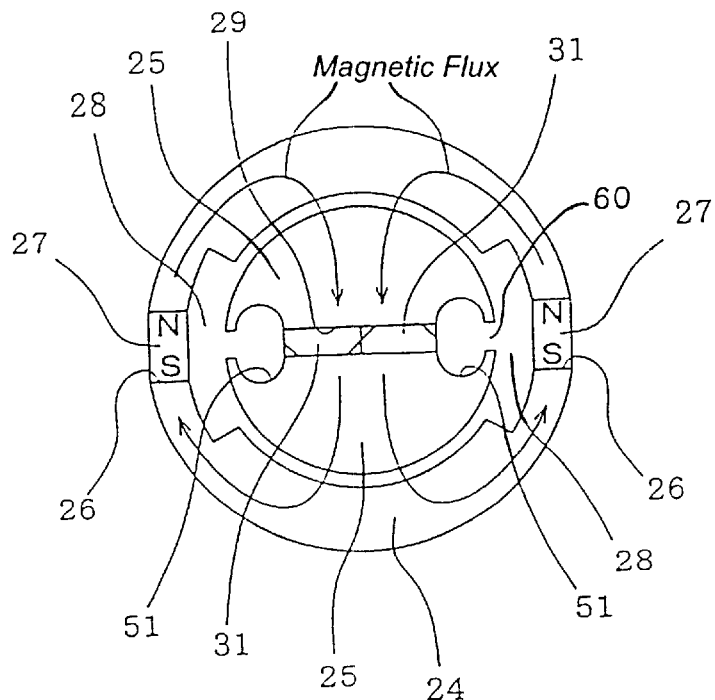
FIG. 6 is a sectional view which shows an angular position measuring device according to fourth embodiment of the invention.

FIG. 6 shows an angular position measuring device according to the fourth embodiment of the invention which is different from the first and second embodiments in that the stator core 25 has formed therein air cavities 51 that are oval in cross section. Other arrangements are identical, and explanation thereof in detail will be omitted here.

The air cavities 51 are formed in diametrically opposed peripheral portions of the stator core 25 so that they communicate with ends of the sensor gap 29, respectively. The formation of the air cavities 51 causes the magnetic flux produced by each of the magnets 27 to concentrate at the center of the stator core 25, that is, the Hall ICs 31 installed in the sensor gap 29, thus resulting in an increase in density of the magnetic flux passing through the Hall ICs 31. This increase will result in an increase in output of the Hall ICs 31, thereby allowing an amplification factor of an output from each of the Hall ICs 31 to be decreased. The decreasing of the amplification factor will minimize undesirable effects of a change in temperature of the Hall ICs 31 on outputs of the Hall ICs 31 and also allows the amplifier installed in each of the Hall ICs 31 to be simplified in circuit structure.

Each of the air cavities 51 communicates with the air cavities 28 through a slit 60 formed in the periphery of the stator core 25, thereby providing as wide an outer surface of the stator core 25 into which the magnetic flux enters as possible. This causes a greater magnetic flux from the rotor core 24 to enter the stator core 25, thus increasing the outputs of the Hall ICs 31.

Figure 7:
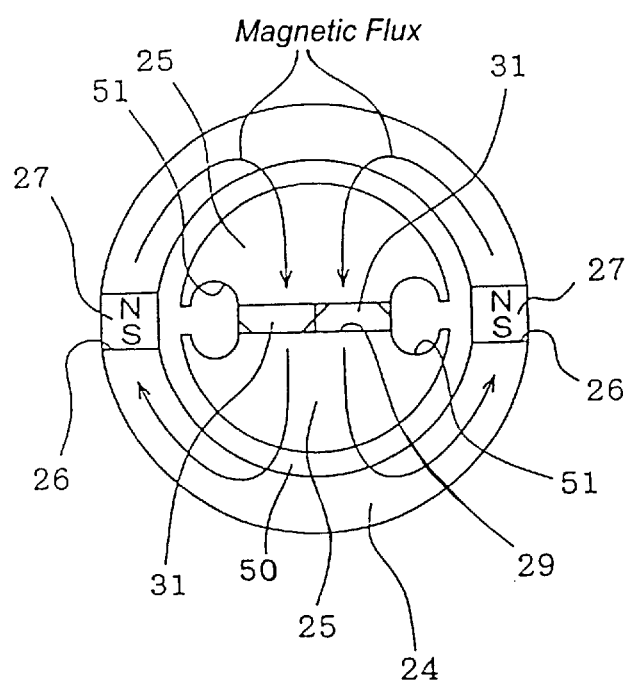
FIG. 7 is a sectional view which shows an angular position measuring device according to the fifth embodiment of the invention.

FIG. 7 shows an angular position measuring device according to the fifth embodiment of the invention which is different from the fourth embodiment only in that the air gap 50 is formed to be constant in width without forming the air cavities 28 in the rotor core 24. Other arrangements are identical, and explanation thereof in detail will be omitted here.

The air cavities 51 which are formed in diametrically opposed peripheral portions of the stator core 25, like the fourth embodiment, serve to concentrate the magnetic flux produced by each of the magnets 27 at the sensor gap 29, thus resulting in an increase in density of the magnetic flux passing through the Hall ICs 31 and also work to avoid a short of the magnetic flux between each pole of the magnets 27 and the stator core 25.

Figure 8:
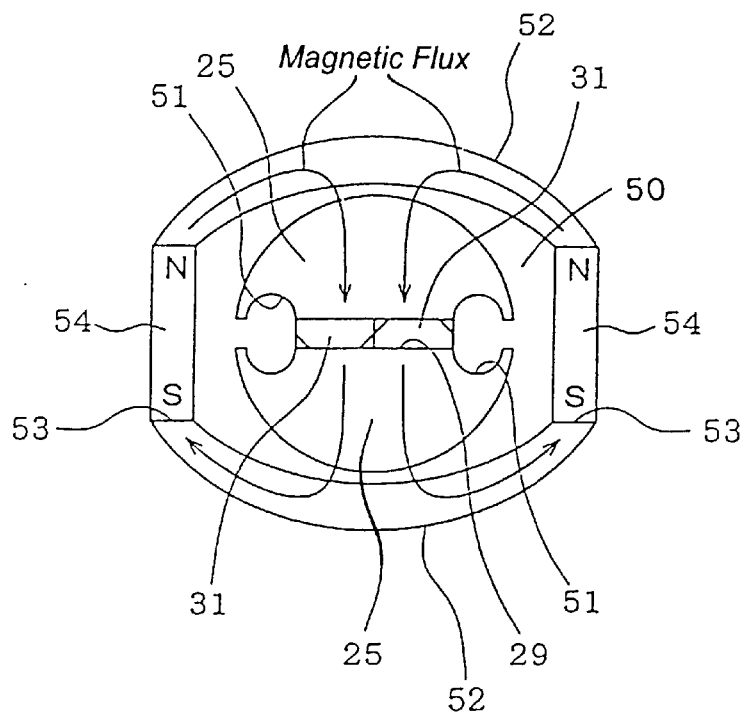
FIG. 8 is a sectional view which shows an angular position measuring device according to the sixth embodiment of the invention.

FIG. 8 shows an angular position measuring device according to the sixth embodiment of the invention which is different from the first to fifth embodiments in that a rotor core 52 is made of a cylindrical member that is oval or elliptical in cross section. Other arrangements are identical, and explanation thereof in detail will be omitted here.

The rotor core 52 has formed in its ends in a longitudinal direction thereof recesses 53 within which magnets 54 are fitted using adhesive, respectively. The air gap 50 between the rotor core 52 and the stator core 25 increases in volume as approaching each of the magnets 54 (i.e., each pole of the magnets 54), thereby defining a greater air cavity around each of the magnets 54 which serves, like the air cavities 28, to avoid a short of the magnetic flux between one of poles of the magnets 54 and the stator core 25.

The air gap 50 decreases in volume gradually as leaving, from each of the magnets 54, thereby preventing the magnetic flux from the inner surface of the rotor core 52 to the outer surface of the stator core 25 from being biased toward each of the magnets 54, thus resulting in uniformity of the magnetic flux entering the stator core 25. This improves the linearity of a change in density of the magnetic flux in the sensor gap 29 with a change in rotational angle of the rotor core 52.

Figure 9:
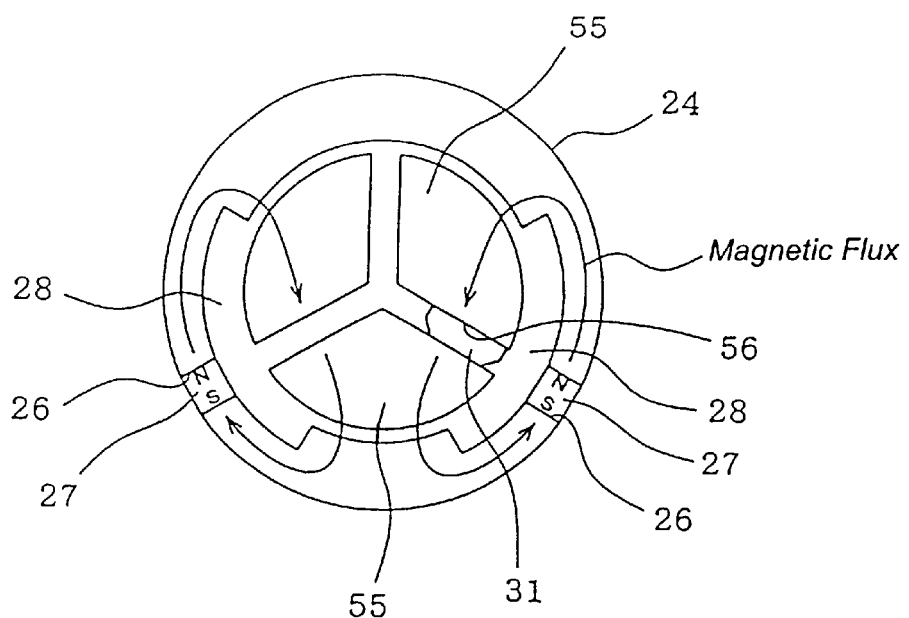
FIG. 9 is a sectional view which shows an angular position measuring device according to the seventh embodiment of the invention.

FIG. 9 shows an angular position measuring device according to the seventh embodiment of the invention.

The angular position measuring devices of the first to sixth embodiments are so designed that the density of a magnetic flux passing through the sensor gap 29 increases and decreases in a cycle of 180° (see FIG. 3) and, thus, have an effective angular position-measuring range of 180° or less within which an output of each of the Hall ICs 31 changes linearly. The angular position measuring device of this embodiment is so designed as to have a wider angular position-measuring range over 180°.

The stator core 55 is made up of three parts which are assembled to define three sensor gaps 56 which extend radially from the center thereof at an angular interval of 120°. The Hall IC 31 is disposed within one of the sensor gaps 56. Two magnets 27 are installed in the rotor core 24 at an angular interval of 120° which is equal to that of the sensor gaps 56. The rotor core 24 has two air cavities 28 formed in the vicinity of the magnets 27 for avoiding a short of the magnetic flux between each pole of the magnets 27 and the stator core 25. Other arrangements are identical with those of the first embodiment, and explanation thereof in detail will be omitted here.

When the rotor core 24 is in a position as shown in FIG. 9, the magnetic flux emerging from the North pole of a right one of the magnets 27 goes to an upper right portion of the stator core 55 through the rotor core 24 to a right one of the sensor gaps 56 (i.e., the Hall IC 31) and back to the rotor core 24 through a lower right portion of the stator core 55 and enters the South pole of the right magnet 27. The magnetic flux emerging from the North pole of a left one of the magnets 27 goes to an upper left portion of the stator core 55 through the rotor core 24 to a left one of the sensor gaps 56 and back to the rotor core 24 through a lower left portion of the stator core 55 and enters the South pole of the left magnet 27.

Figure 10:
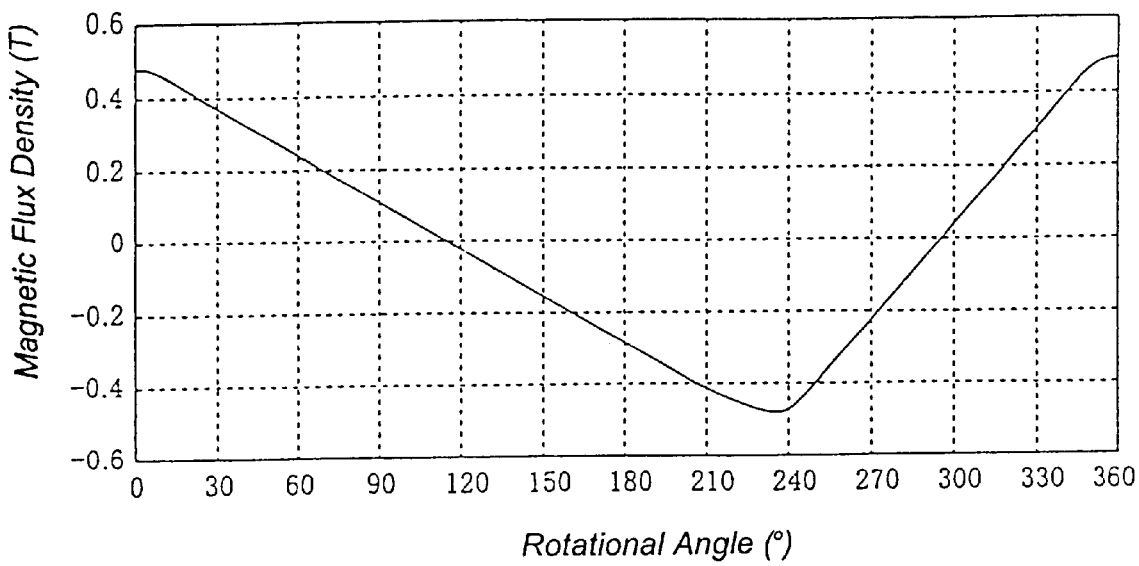
FIG. 10 is a graph which shows a relation between a rotational angle of a rotor core and the density of magnetic flux passing through a Hall IC in the seventh embodiment.

When the rotor core 24 starts to rotate, it will cause the density of magnetic flux through each of the right and left sensor gaps 56 of the stator core 55 to decrease, as shown in FIG. 10, as a function of a rotational angle of the rotor core 24 within a range of approximately 0° to 230° and then increase as a function of a rotational angle of the rotor core 24 within a range of approximately 240° to 350°.

Specifically, the range within which the density of magnetic flux passing through the Hall IC 31 decreases linearly is asymmetrical with, that is, wider than the range within which the density of magnetic flux passing through the Hall IC 31 increases linearly, thereby enabling the angular position measuring device of this embodiment to produce an output which changes linearly as a function of a rotational angle of the rotor core 24 over an angular range of approximately 220°.

Figure 11:
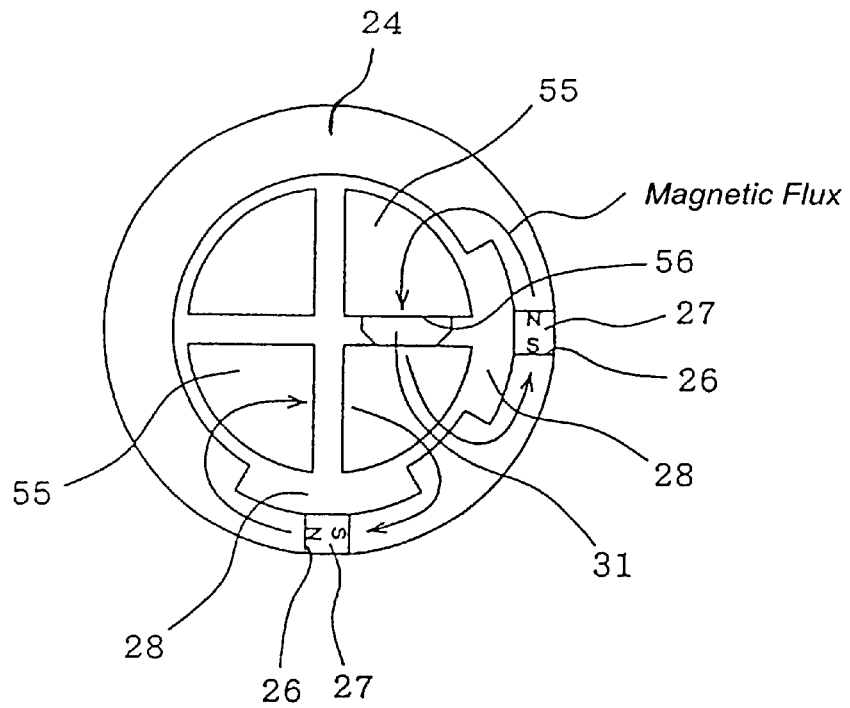
FIG. 11 is a sectional view which shows an angular position measuring device according to the eighth embodiment of the invention.

FIG. 11 shows an angular position measuring device according to the eighth embodiment of the invention which is different from the seventh embodiment in that the stator core 55 is made up of four parts which are assembled to form four sensor gaps 56 which extend radially from the center thereof at an angular interval of 90°, and two magnets 27 are installed in the rotor core 24 at an angular interval of 90°. Other arrangements are identical, and explanation thereof in detail will be omitted here.

When the rotor core 24 is in a position as shown in FIG. 11, the magnetic flux emerging from the North pole of a right one of the magnets 27 goes to an upper right portion of the stator core 55 through the rotor core 24 to a right one of the sensor gaps 56 within which the Hall IC 31 is installed and back to the rotor core 24 through a lower right portion of the stator core 55 and enters the South pole of the right magnet 27. The magnetic flux emerging from the North pole of the lower magnet 27 goes to a lower left portion of the stator core 55 through the rotor core 24 to the lower sensor gap 56 and back to the rotor core 24 through a lower right portion of the stator core 55 and enters the South pole of the lower magnet 27.

Figure 12:
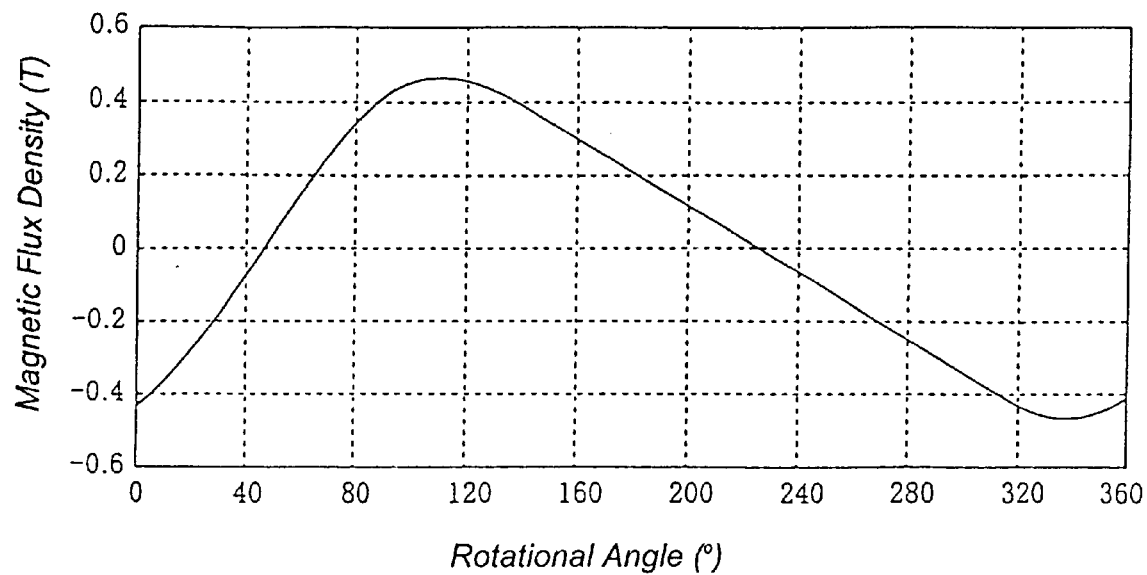
FIG. 12 is a graph which shows a relation between a rotational angle of a rotor core and the density of magnetic flux passing through a Hall IC in the eighth embodiment.

The angular position measuring device of this embodiment is capable of producing an output which changes, as shown in FIG. 12, linearly as a function of a rotational angle of the rotor core 24 over an angular range of approximately 200°.

Figure 13:
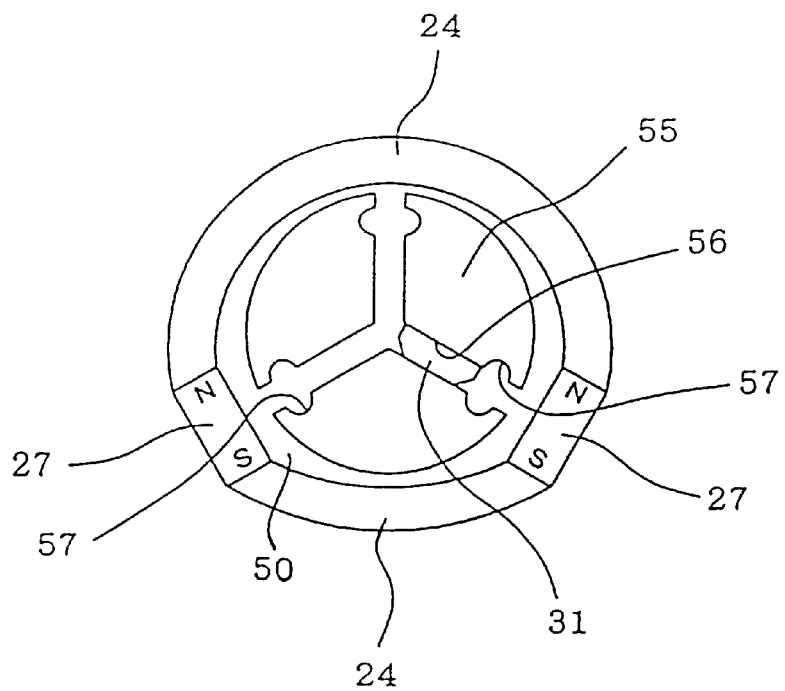
FIG. 13 is a sectional view which shows an angular position measuring device according to the ninth embodiment of the invention.

FIG. 13 shows an angular position measuring device according to the ninth embodiment of the invention which is a modification of the one shown in FIG. 9.

The stator core 55 has three air cavities 57, like the air cavities 51 shown in FIGS. 6, 7, and 8, which are oval in cross section and which serve to concentrate the magnetic flux on the Hall IC 31 installed in one of the sensor gaps 56.

The air gap 50 between the rotor core 24 and the stator core 55 increases in volume as approaching each of the magnets 27, thereby defining a greater air cavity around each of the magnets 27 which serves, like the air cavities 28, to avoid a short of the magnetic flux between one of poles of the magnets 27 and the stator core 55.

Figure 14:
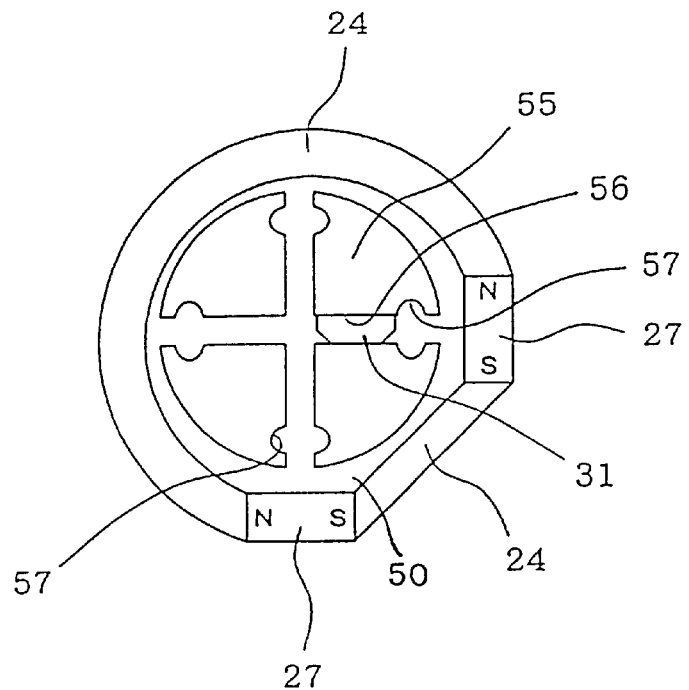
FIGS. 14 to 16 are sectional views which show modifications of the angular position measuring device shown in FIG. 13.

FIG. 14 shows an angular position measuring device which is a modification of the one shown in FIG. 11.

The stator core 55 has four air cavities 57, like the air cavities 51 shown in FIGS. 6, 7, and 8, which are oval in cross section and which serve to concentrate the magnetic flux at the Hall IC 31 installed in one of the sensor gaps 56.

The air gap 50 between the rotor core 24 and the stator core 55 increases in volume as approaching each of the magnets 27, thereby defining a greater air cavity around each of the magnets 27 which serves, like the air cavities 28, to avoid a short of the magnetic flux between one of poles of the magnets 27 and the stator core 55.

The air gap 50 decreases in volume gradually as leaving from each of the magnets 54, thereby preventing the magnetic flux from the inner surface of the rotor core 52 to the outer surface of the stator core 25 from being biased toward each of the magnets 54, thus resulting in uniformity of the magnetic flux entering the stator core 25. This improves the linearity of a change in density of the magnetic flux in the sensor gap 29 with a change in rotational angle of the rotor core 52.

Figure 15:
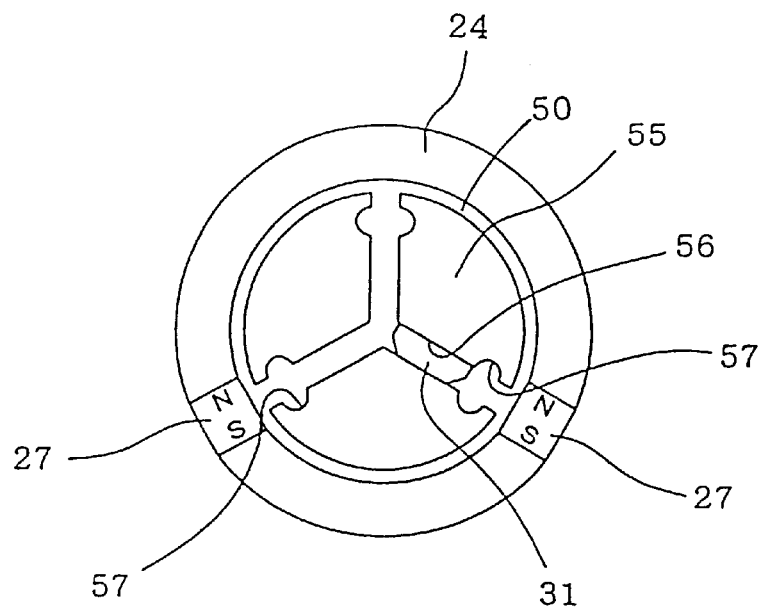

FIG. 15 shows an angular position measuring device which is a modification of the one shown in FIG. 13.

The stator core 55 is formed coaxially with the rotor core 24 so as to form a constant air gap 50 between the stator core 55 and the rotor core 24. Other arrangements are identical with those in FIG. 13, and explanation thereof in detail will be omitted here.

Figure 16:
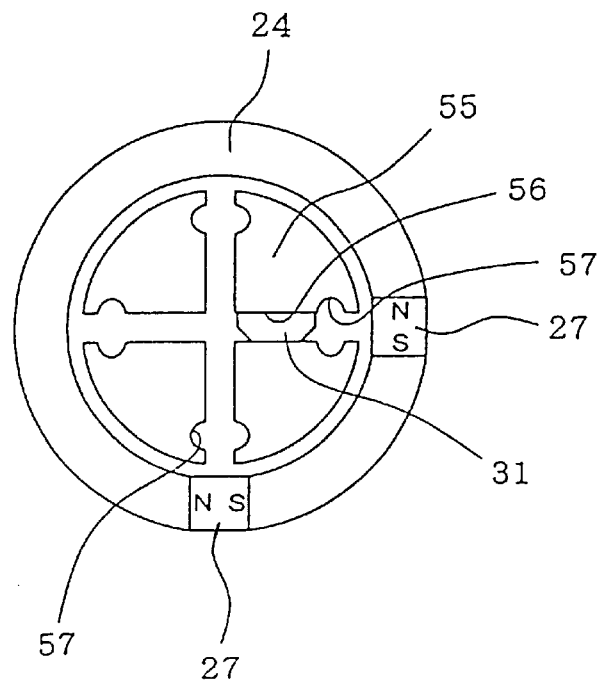

FIG. 16 shows an angular position measuring device which is a modification of the one shown in FIG. 14.

The stator core 55 is formed coaxially with the rotor core 24 so as to form a constant air gap 50 between the stator core 55 and the rotor core 24. Other arrangements are identical with those in FIG. 14, and explanation thereof in detail will be omitted here.

While the sensor gaps 56 in the seventh to ninth embodiments are formed at regular angular intervals, they may alternatively be arranged at irregular angular intervals depending upon a desired angular position-measuring range. Further, the angular interval between the two magnets 27 may be different from that of the air gaps 56. In this case, the same effects as provided by the seventh to ninth embodiments are obtained by modifying the location and/or the shape of the magnetic flux short-avoiding air cavities 28 formed in the rotor core 24 as needed.

Figure 17:
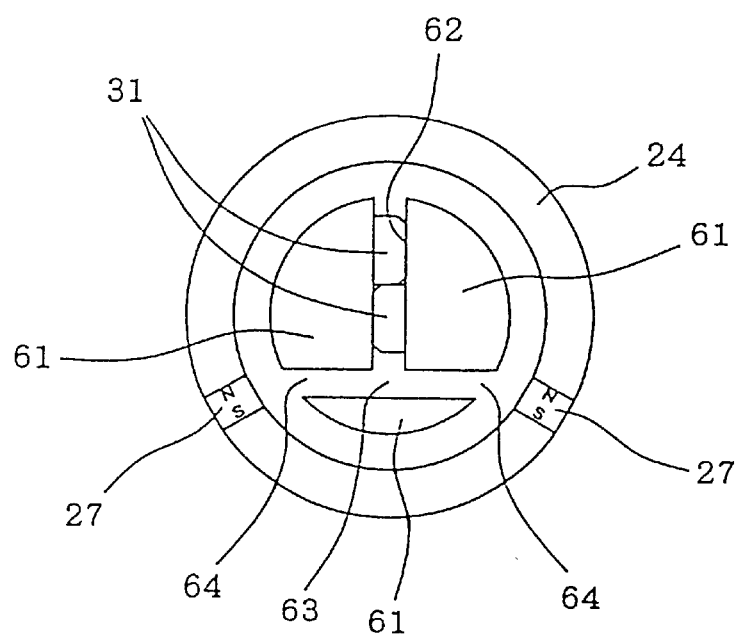
FIG. 17 is a sectional view which shows an angular position measuring device according to the tenth embodiment of the invention.

FIG. 17 shows an angular position measuring device according to the tenth embodiment of the invention.

In the angular position measuring device of each of the first to sixth embodiments, the sensor gap 29 extends over a diameter of the stator core 25 and has a length sufficient to array the two Hall ICs 31. However, the angular position measuring device in each of the seventh to ninth embodiments has formed therein more than two sensor gaps whose length is equal to the radius of the stator core 25 and may be insufficient to array two Hall ICs if the stator core 25 is decreased in size for compactness of the device. In order to avoid this problem, the angular position measuring device of the tenth embodiment makes a stator core of three or more parts so as to form at least one air gap longer than the radius of the stator core.

Specifically, the stator core 61 is made up of three parts so as to define two shorter air gaps 64 and one longer air gap 62. The air gaps 64 are aligned with each other horizontally, as viewed in the drawing. Upper two of the three parts of the stator core 61 are symmetrical so as to have the air gap 64 pass through the center of the stator core 61. The air gap 64, thus, has the length longer than the radius of the stator core which is sufficient to array two Hall ICs 31.

Two magnets 27 are so arranged in the rotor core 24 that when one of the magnets 27 face an end of one of the air gaps 64, the other magnet 27 face a diametrically opposed end of the other air gap 64. Cavities like the air cavities 51 as shown in FIGS. 6, 7, and 8 may be formed in the air gaps 64.

Figure 18:
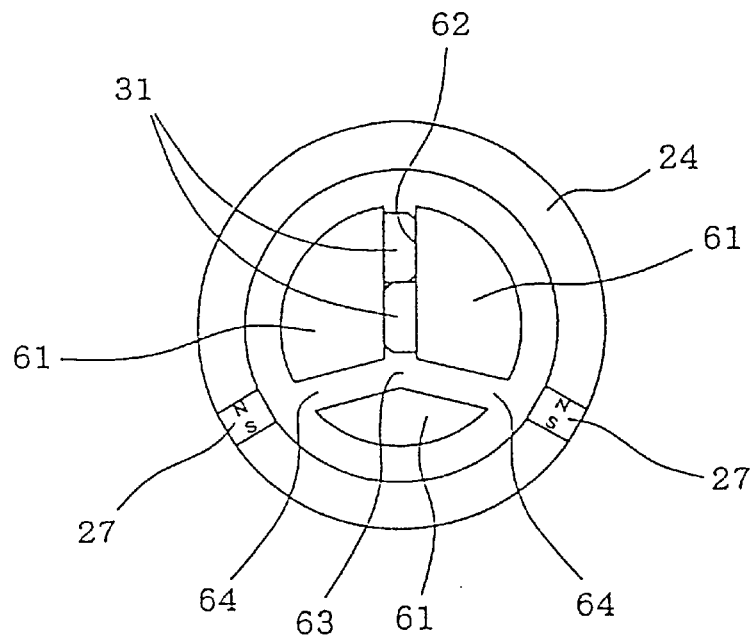
FIG. 18 is a sectional view which shows a modification of the angular position measuring device shown in FIG. 17.

FIG. 18 shows an angular position measuring device which is a modified form of the one shown in FIG. 17 and different therefrom only in that two air gaps 64 inclined downward, as viewed in the drawing, without being aligned with each other. This structure also provides the same effects as in the above tenth embodiment.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims. For example, the two Hall ICs 31 may be laid to overlap each other in parallel to the magnetic flux in the sensor gap 29. Alternatively, a single Hall IC may be used or three or more Hall ICs may be arrayed in parallel or perpendicular to the magnetic flux depending upon the size of the sensor gap 29. Instead of the Hall ICs 31, magnetoresistive elements may be employed. Further, the rotor core 24 or 52 in the above embodiments is installed in the device housing 21 to be rotatable in synchronism with rotation of the rotary shaft 22, however, it may be secured to the device housing 21 to be stationary, while the inner core 25, 55, or 61 may be retained by the connector housing 33 to be rotatable following rotation of the rotary shaft 22.

What is claimed is:

1. An angular position measuring device comprising:
   a stationary member;
   a rotatable member rotatable following rotation of an object to be measured in angular position;
   a plurality of magnets installed in one of said stationary member and said rotatable member so that the same poles are opposed magnetically to produce a repellent force in magnetic fields of the magnets; and
   a sensor element installed in the other of said stationary member and said rotatable member, said sensor element being responsive to a change in density of magnetic flux produced by said magnets to provide an output as a function of an angular position of the object.

2. An angular position measuring device as set forth in claim 1, wherein each of said magnets is made of one of a plate and a cylindrical member whose ends are magnetized.

3. An angular position measuring device as set forth in claim 1, wherein said rotatable member is made of a hollow cylindrical yoke having installed therein said magnets, and said stationary member is made of a stator core having installed therein said sensor element and disposed inside the cylindrical yoke, and further comprising a sensor gap formed in the stator core within which said sensor element is disposed.

4. An angular position measuring device as set forth in claim 3, wherein the cylindrical yoke has air cavities formed in an inner surface thereof which open to said magnets for avoiding a short of the magnetic flux between each pole of the magnets and the stator core.

5. An angular position measuring device as set forth in claim 1, wherein said magnets are so arranged as to define two magnetic paths along which the magnetic fluxes produced by said magnets pass, the magnetic paths extending symmetrically through said stationary member and said rotatable member.

6. An angular position measuring device as set forth in claim 3, wherein the stator core is made of three or more parts which are so fabricated as to define air gaps one of which is the sensor gap within which said sensor element is disposed.

7. An angular position measuring device as set forth in claim 6, wherein the air gaps extend radially in the stator core at a regular angular interval, and wherein said magnets are arranged at an angular interval identical with the angular interval of the air gaps.

8. An angular position measuring device as set forth in claim 6, wherein the stator core is circular in cross section, and wherein the one of the air gaps employed as the sensor gap is longer than a radius of the stator core.

9. An angular position measuring device as set forth in claim 8, wherein the one of the air gaps as employed as the sensor gap is longer than the other air gaps.

10. An angular position measuring device as set forth in claim 3, wherein the stator core has formed in at least one of ends of the sensor gap a greater air cavity which serves to concentrate the magnetic flux at the sensor gap.

11. An angular position measuring device as set forth in claim 1, further comprising an air gap defined between an inside of said rotatable member and an outside of said stationary member, said air gap being so oriented geometrically that an interval between the inside of said rotatable member and the outside of said stationary member varies in a direction of rotation of said rotatable member.

12. An angular position measuring device as set forth in claim 11, wherein the interval between the inside of said rotatable member and the outside of said stationary member is maximized at each of the poles of said magnets.

13. An angular position measuring device as set forth in claim 12, wherein said rotatable member is made of a hollow member defining therein an oval chamber in which said stationary member made of a cylindrical member is disposed.

14. An angular position measuring device as set forth in claim 3, further comprising an air gap defined between an inside of said cylindrical yoke and an outside of said stator core, said air gap being defined by an interval between the inside of said cylindrical yoke and the outside of said stator core which varies in a circumferential direction of the inside of said cylindrical yoke.

15. An angular position measuring device as set forth in claim 14, wherein the interval between the inside of said cylindrical yoke and the outside of said stator core is maximized at each of the poles of said magnets.

16. An angular position measuring device as set forth in claim 15, wherein said cylindrical yoke defines therein an oval chamber in which said stator core is disposed.

17. An angular position measuring device as set forth in claim 1, wherein the one of said stationary member and said rotatable member is formed by a hollow cylindrical member made of a plurality of parts, and wherein each of said magnets is disposed between adjacent two of the parts so that said magnets have poles repel each other in the magnetic fields.

18. An angular position measuring device as set forth in claim 17, wherein said parts are so joined that each of said parts forms a portion of a circumference of the hollow cylindrical member within which the other of said stationary member and said rotatable member is disposed, and wherein magnetic fluxes produced by said magnets are concentrated on said sensor element installed in the other of said stationary member and said rotatable member.

19. An angular position measuring device as set forth in claim 18, wherein each of said magnets is made of one of a plate and a cylindrical member whose ends are magnetized to have poles facing the adjacent parts, respectively.

20. An angular position measuring device as set forth in claim 1, wherein said rotatable member is made of the hollow cylindrical member, and said stationary member is made of a stator core having installed therein said sensor element and disposed inside the cylindrical member, and further comprising a sensor gap formed in the stator core within which said sensor element is disposed.

* * * * *